United States Patent [19]

Fremgen

[11] Patent Number: 5,754,723
[45] Date of Patent: May 19, 1998

[54] MULTI-FILAMENT SPLICE ENCLOSURES

[75] Inventor: Dieter Fremgen, Wülfrath, Germany

[73] Assignee: Raychem GmbH, Ottobrunn, Germany

[21] Appl. No.: 586,652

[22] PCT Filed: Jul. 4, 1994

[86] PCT No.: PCT/GB94/01441

§ 371 Date: Jan. 5, 1996

§ 102(e) Date: Jan. 5, 1996

[87] PCT Pub. No.: WO95/02203

PCT Pub. Date: Jan. 19, 1995

[30] Foreign Application Priority Data

Jul. 8, 1993 [GB] United Kingdom ............ 9314161

[51] Int. Cl.[6] ........................................ G02B 6/00
[52] U.S. Cl. .................... 385/135; 385/134; 385/136
[58] Field of Search ...................... 385/134–137, 385/99

[56] References Cited

U.S. PATENT DOCUMENTS

| 4,266,853 | 5/1981 | Hutchins | 385/135 |
|---|---|---|---|
| 4,595,255 | 6/1986 | Bhatt et al. | 385/135 |
| 4,792,203 | 12/1988 | Nelson et al. | 385/135 |
| 4,812,004 | 3/1989 | Biederstedt et al. | 385/135 |
| 5,189,723 | 2/1993 | Johnson | 385/134 |
| 5,495,549 | 2/1996 | Schneider et al. | 385/135 |

FOREIGN PATENT DOCUMENTS

| 0 159 857 | 10/1985 | European Pat. Off. . |
| 0 333 316 | 9/1989 | European Pat. Off. . |
| 0 579 019 | 1/1994 | European Pat. Off. . |
| 41 40 701 | 12/1992 | Germany . |
| 60-202407 | 10/1985 | Japan ........................ 385/135 |

*Primary Examiner*—Rodney B. Bovernick
*Assistant Examiner*—Hemang Sanghavi
*Attorney, Agent, or Firm*—Herbert G. Burkard

[57] ABSTRACT

A multi-filament splice enclosure (11) comprising a box-like body (12) having an opening lid (13) allowing access to organiser trays (24) arranged in a stack within the enclosure. The organiser trays are arranged on guide means (28), preferably mounted on a carrier (30) that allows the stack of trays to be raised for access thereto when the lid (13) is open. The trays (24) are removeable from the carrier (30) for access to the individual filaments.

11 Claims, 2 Drawing Sheets

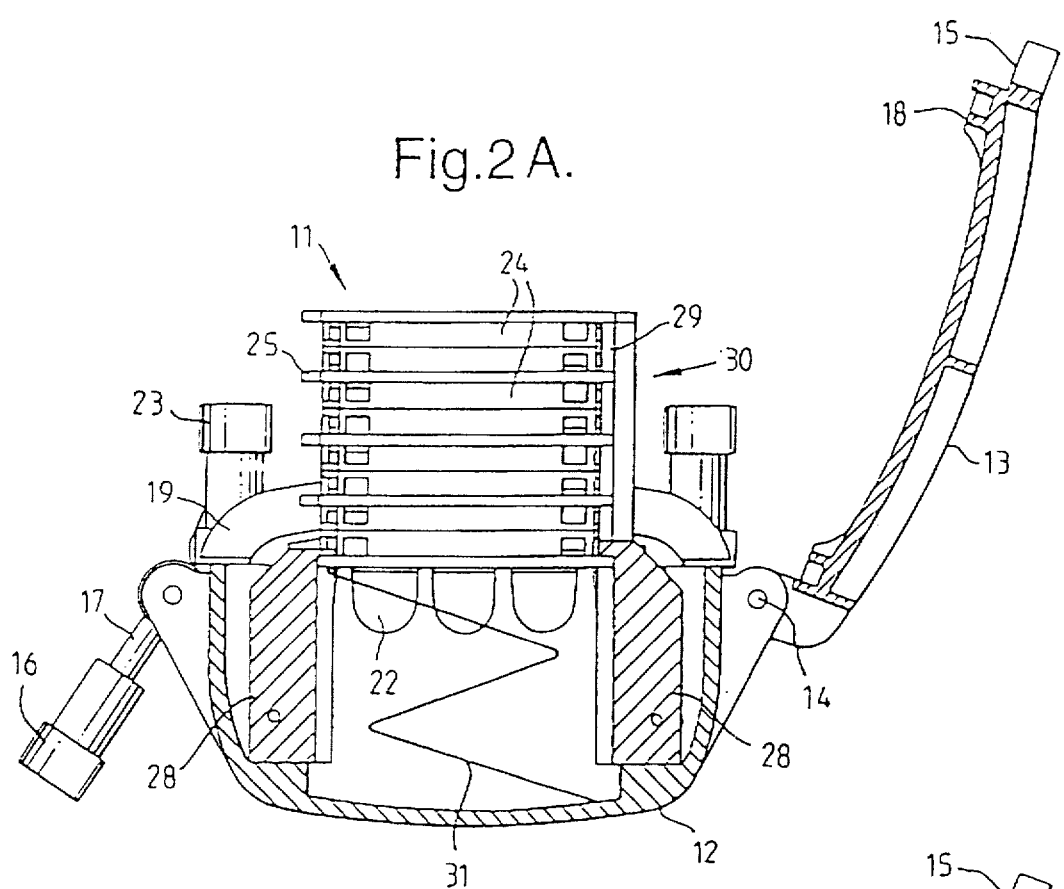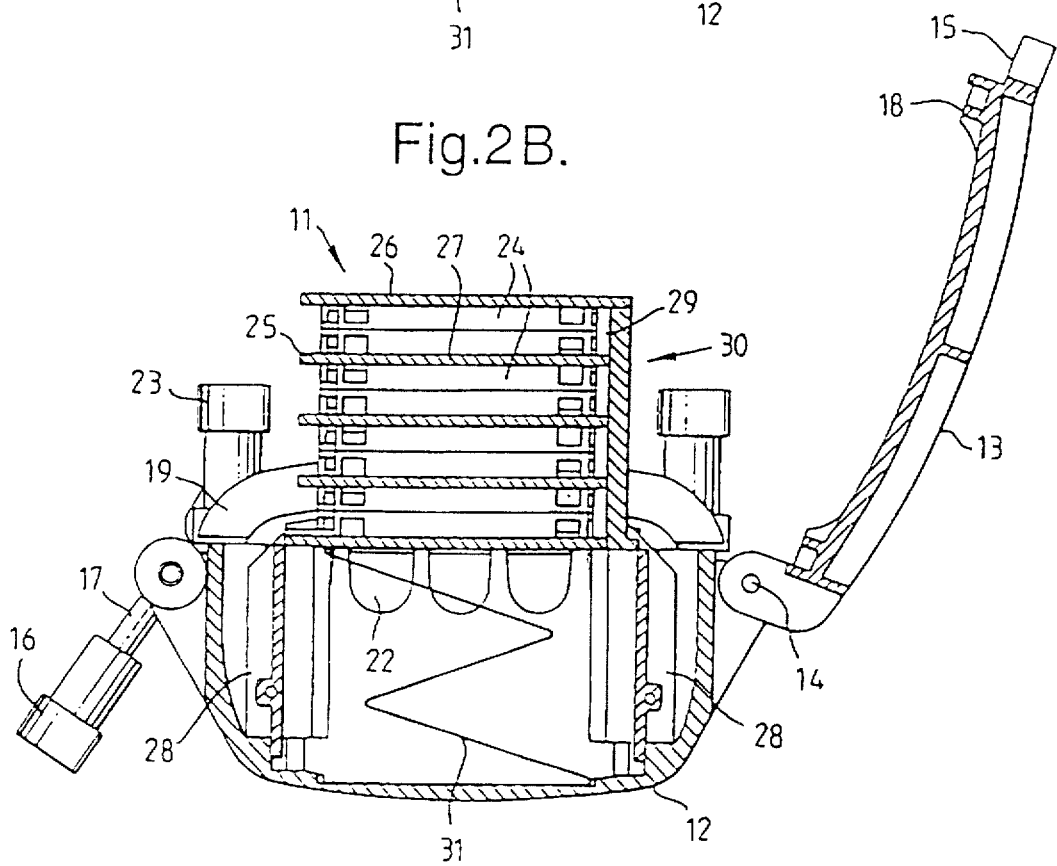

MULTI-FILAMENT SPLICE ENCLOSURES

BACKGROUND OF THE INVENTION

The present invention relates to enclosures for multi-filament cable splices, and in particular to an enclosure for a splice between optical fibre cables.

In splicing arrangements for multi-filament cables especially optical fibres, the joined optical fibres are arranged on organiser trays which retain the optical fibres at the correct minimum bend radius. These devices provide easy access to the individual fibres contained within the trays and each tray can be marked to identify the different fibres. The trays are typically stacked next to one another and may be hinged to a carrier allowing them to move relative to one another for access to the individual organiser trays.

Such a device is shown in EP-A-159857, and in U.S. Pat. No. 4,266,853.

SUMMARY OF THE INVENTION

The present invention provides an enclosure for a splice for multifilament cables giving improved access to organiser trays within the enclosure.

Accordingly there is provided a multi-filament (preferably an optical fibre, but possibly a copper wire or other filament) splice enclosure having a normally closed opening allowing access to a plurality of filament organiser trays arranged in a stack within the enclosure, the organiser trays being mounted within the enclosure on guide means allowing the stack of trays to be raised through the opening when open to provide access to the or each organiser tray.

Preferably the enclosure comprises a substantially box-like body with an opening lid hinged or otherwise moveably fixed at one side of the box, and the stack of trays is accessible through the lid when open, the trays being liftable away from, and preferably out, of the interior of the box.

The guide means may have an abutment thereon to limit the upward movement of the stack of trays.

Preferably the guide means is formed integrally with the box-like body (although it may be formed separately and subsequently bonded, bolted riveted or interlocked with it) which is a preferably plastics moulding, preferably formed from polypropylene or polyamide, but other polymer materials such as high density polyethylene, acrylics etc. may be suitable.

The stack of trays may be locked in a lifted position by a releasable detent. The detent may be formed on at least one of the guide means.

The organiser trays may be arranged in a carrier unit which is in turn mounted on the guide means. In this case the detent could be formed on the carrier unit.

The organiser trays are moveable within the carrier unit, preferably by being pivoted or slidably fixed thereto, for access to the filaments.

The splice is especially useful in the field of optical fibres, for example in a telecommunications network, and the invention is applicable to both butt splice enclosures and in-line splice closures.

BRIEF DESCRIPTION OF THE DRAWINGS

The invention will be described by way of example only and with reference to the accompanying drawings, FIGS. 1 and 2A-2B of which shown in isometric view and in transverse sections respectively an enclosure for a splice for multi-filament cables, showing the enclosure in an open condition with the stack of organiser trays in a raised position.

DESCRIPTION OF THE PREFERRED EMBODIMENTS

Figure 1:
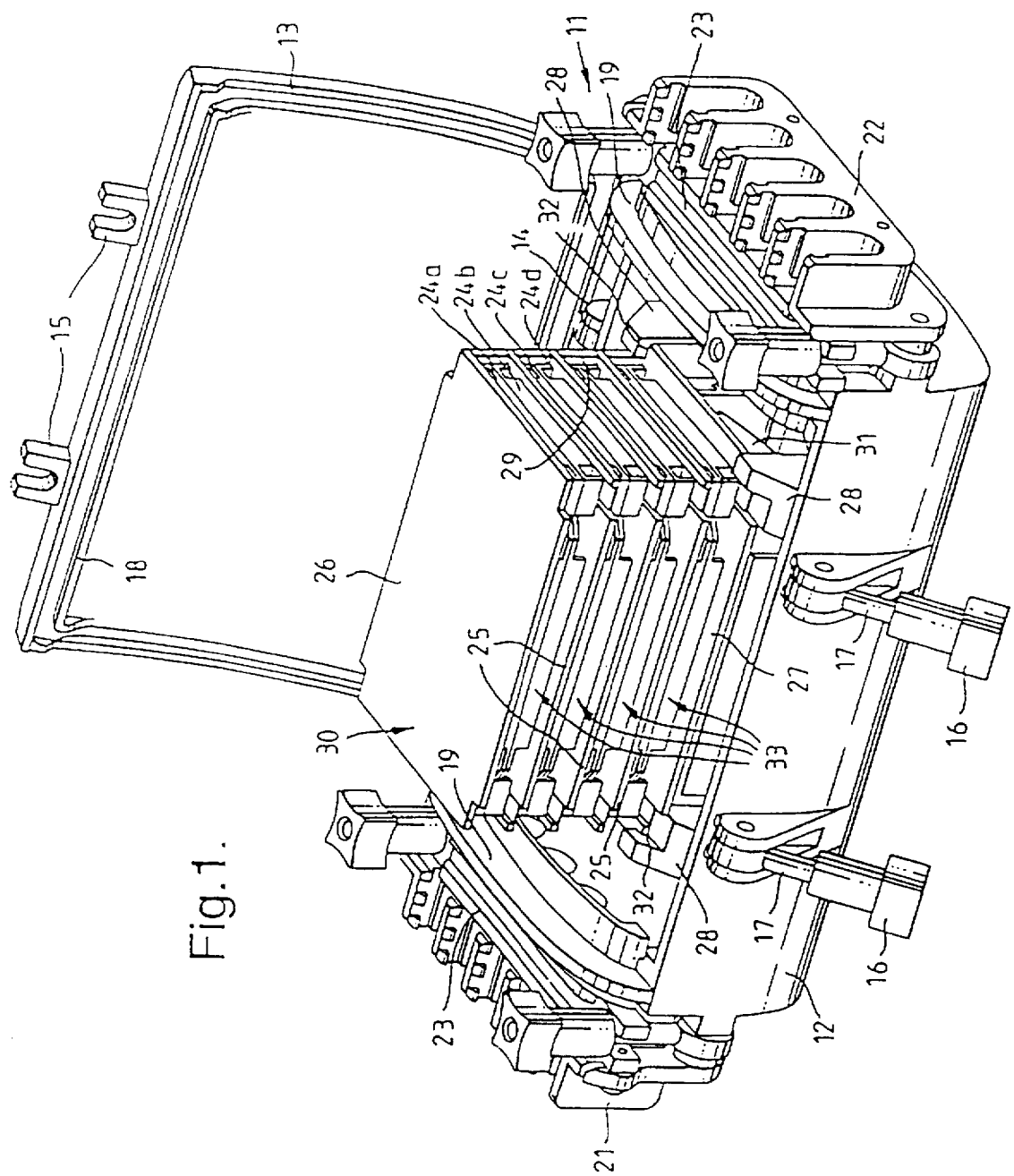

The enclosure 11 illustrated is for an in-line cable splice but the invention is not restricted to in-line splices. The enclosure 11 may be manufactured from a plastics material such as polypropylene, or polyamide and comprises a box-like body 12 having a lid 13 which is hinged to the body at one side by hinges 14. The other side of the lid away from the hinged 14 has lugs 15 thereon which are engageable with locking nuts 16 and screw-threaded struts 17 pivoted on the other side of the box-like body 12 to hold the lid in a closed position.

The lid 13 and body 12 have interengaging rims 18, 19 which seal the interior of the box against the ingress of moisture. If necessary a sealing aid for example, a sealing material such as silicone or other rubber, gel, or mastic may be applied to the interengaging surfaces. Other sealing aids that may be used are shaped rubber gaskets, sealing rings etc.

Cable ports 21, 22 are located at the ends of the body 12. A plurality of multi-filament cables such as optical fibre cables can enter and exit the interior of the body through cable ports 21, 22. An external jacket of the cables is secured at each end of the body 12 by a clamping device 23 held in position by a similar closure mechanism to that of the lid, and the cables may be sealed in the respective ports by a surrounding seal. The surrounding cable seal may be of any suitable form and may be a elastomeric resiliently deformable preformed seal, such as silicone or other rubber or gel, or a sealant such as a mastic material.

The optical fibres are spliced and the individual spliced fibres are placed on rectangular or other shaped organiser trays 24 which are each adapted to retain and store the slack in at least one fibre that was required for original alignment and splicing remote from the enclosure or that might be required for repair or further splice work on individual fibres.

The organiser trays 24 are arranged in a stack one upon the other, with the organiser trays being optionally arranged in back-to-back pairs 24a 24b, 24c 24d, etc. Between adjacent pairs of organiser trays 24a 24b, 24c 24d etc. there may be located partition walls 25 held apart along one longitudinal edge by spacers 29. End walls 26, 27 are located at the upper and lower ends of the stack. In this example there are four pairs of organiser trays, but other numbers of pairs could equally be utilised. The walls on 26, 27 and 25 on each side of a pair of trays, and the spacers 29 form housings 33 into which the organiser trays (24) can be retracted. The trays 24 and walls and spacers 25, 26, 27, 29 together form a cassette-like carrier unit or stack 30 which is mounted on a plurality of guide members 28 located one at each corner of the cassette-like unit 30. These guide members 28 have guide surfaces which slideably support and guide the cassette-like unit 30 allowing the unit 30 to be raised out of the interior of the body 12. When in the raised condition the lower end wall 27 engages abutments 32, in the upper end portions of the guides 28 to limit the upward movement of the unit 30. The raising of the unit 30 could be assisted by the provision of a resilient body such as a plastics material or metal leg spring or coil spring between the lower end wall 27 and the base of the box-like body 12.

The cassette-like unit (30) may be retained in its fully raised position by resilient means such as a spring 31 or a releasable detent, which bears against or engages the lower end plate 27. The cassette unit 30 may be lowered back into the interior of the box simply by releasing the detent. The spring 31 may automatically raise the cassette-like unit 30 on release of a detent.

The detent may also be engageable with the partition walls 25 so that the cassette unit may be held in various partially raised positions When in a raised position a tray 24 may be exposed for access to its fibres or removed from the unit by, for example, pivoting that tray 24 at a corner. Each tray is preferably able to pivot in a plane normal to the direction in which the stack is raised.

FIGS. 2A and 2B show cross-sections at different positions through the closure of FIG. 1.

I claim:

1. A multi-filament optical fiber splice enclosure having an opening allowing access to a plurality of filament organizer trays arranged in a stack within the enclosure, the enclosure including guide means associated with the enclosure and having the stack of organizers trays mounted on the guide means for guiding the stack of trays to a raised position through the opening to provide access to each organizer tray, the guide means including an abutment associated therewith for limiting the upper movement of the stack of trays so that the lower most accessible organizer tray of the stack of trays remains closely adjacent upper peripheries of a base of the enclosure in the raised position, a plurality of ports positioned in at least two side walls of the enclosure for inserting multi-filament optical fiber cables therethrough, and a plurality of clamping devices respectively positioned adjacent a respective corresponding one of the plurality of ports for clamping multi-filament cables inserted there through.

2. An enclosure as claimed in claim 1, wherein the stack of trays can be locked in a raised position by a releasable detent.

3. An enclosure as claimed in claim 2 wherein the stack can be locked in a selected one of a plurality of various raised positions.

4. An enclosure as claimed in claim 1 wherein organizer trays are arranged in a carrier unit, which is mounted in the guide means.

5. An enclosure as claimed in claim 4, wherein the carrier unit is subdivided into a plurality of housings and into each of such housing at least one organizer tray is located.

6. An enclosure as claimed in claim 5, wherein there is a pair of back-to-back organizer trays located in each housing.

7. An enclosure as claimed in claim 1, wherein an organizer tray can be moved pivotally or by sliding relative to another organizer tray to allow access to a filament on at least one of those trays.

8. An enclosure as claimed in claim 7, wherein the organizer trays are pivotally connected to a carrier unit which is mounted in the guide means.

9. An enclosure as claimed in claim 7, wherein an axis of rotation of the organizer tray is substantially parallel to the guide means so that the organizer trays rotate in a plane perpendicular to a direction of movement of the stack during raising thereof.

10. An enclosure as claimed in claim 1, wherein the organizer trays are substantially rectangular in shape, and there are four guide means located one at each corner of the filament organizer trays in the stack.

11. An enclosure as claimed in claim 1, wherein the enclosure has a substantially box-like body with an opening lid moveably fixed thereto at one side thereof and the stack of organizer trays is accessible through said lid when open, the trays being liftable away from the interior of the box.

* * * * *